United States Patent
Nakagawa et al.

(10) Patent No.: US 11,893,528 B2
(45) Date of Patent: Feb. 6, 2024

(54) LOGISTICS OPERATION OPTIMIZATION APPARATUS AND LOGISTICS OPERATION OPTIMIZATION METHOD

(71) Applicant: Hitachi, Ltd., Tokyo (JP)

(72) Inventors: Kaori Nakagawa, Tokyo (JP); Yuichi Kobayashi, Tokyo (JP); Yui Kazawa, Tokyo (JP); Tatsuhiro Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 164 days.

(21) Appl. No.: 17/671,961

(22) Filed: Feb. 15, 2022

(65) Prior Publication Data
US 2023/0027009 A1    Jan. 26, 2023

(30) Foreign Application Priority Data

Jul. 15, 2021   (JP) ................................. 2021-117482

(51) Int. Cl.
  *G06Q 10/083*   (2023.01)
  *G06Q 10/0631*  (2023.01)
(52) U.S. Cl.
  CPC ....... *G06Q 10/083* (2013.01); *G06Q 10/0631* (2013.01)
(58) Field of Classification Search
  CPC .................... G06Q 10/083; G06Q 10/0631
  See application file for complete search history.

(56) References Cited

U.S. PATENT DOCUMENTS

| | | | |
|---|---|---|---|
| 2019/0156283 A1* | 5/2019 | Abebe | G06F 18/24323 |
| 2019/0228492 A1* | 7/2019 | Mizutani | G06Q 50/30 |
| 2020/0364664 A1* | 11/2020 | Chen | G06Q 10/04 |

FOREIGN PATENT DOCUMENTS

| | | | |
|---|---|---|---|
| JP | 2001-253515 A | 9/2001 |
| JP | 2002-154615 A | 5/2002 |
| JP | 2005-324945 A | 11/2005 |

OTHER PUBLICATIONS

Insu Hong, A range-restricted recharging station coverage model for drone delivery service planning, 2018, p. 198-200 (Year: 2018).*

* cited by examiner

*Primary Examiner* — Ibrahim N El-Bathy
(74) *Attorney, Agent, or Firm* — Volpe Koenig

(57) ABSTRACT

A logistics operation optimization apparatus computes, for each operation process, a deviation degree between turns of articles of overall optimum proposals indicated by an overall optimum proposal list and turns of the articles in each operation process, estimation operation time, and an error of the estimation operation time from the overall optimum proposal, and the number of combinations of turns that are defaulted from an overall optimum plan indicated by an overall optimum plan list in the past, evaluates the overall optimum proposal according to an evaluation expression of a weighted linear sum including the deviation degree, the estimation operation time, and the error of the estimation operation time from the overall optimum proposal, and the number of combinations of the turns that are defaulted, and creates an overall optimum plan list of the best overall optimum plan, from the overall optimum proposals indicated by the overall optimum proposal list.

9 Claims, 10 Drawing Sheets

1. itemA
2. itemB
3. itemC
4. itemG
5. itemH
6. itemK
7. ...

| OVERALL OPTIMUM PROPOSAL 203a | PROCESS 203b | DEVIATION DEGREE 203c |
|---|---|---|
| t_opt_001 | PROCESS 1 | 0.22 |
| | PROCESS 2 | 0.31 |
| | PROCESS 3 | 0.12 |
| t_opt_002 | PROCESS 1 | 0.14 |
| | PROCESS 2 | 0.28 |
| | PROCESS 3 | 0.45 |
| .... | .... | .... |

| # | OVERALL PROPOSAL OPERATION SEQUENTIAL ORDER | SITE OPERATION SEQUENTIAL ORDER |
|---|---|---|
| 0010 | itemB→ itemC | itemC→ itemB |
| 0011 | itemH→ itemQ→ itemK | itemQ→ itemK→ itemH |
| 0012 | ... | ... |

| OVERALL OPTIMUM PROPOSAL | DEFAULT MATCHING POINT |
|---|---|
| t_opt_001 | 5 |
| t_opt_002 | 9 |
| ... | ... |

| OVERALL OPTIMUM PROPOSAL | ESTIMATION OPERATION TIME [h] | ERROR |
|---|---|---|
| t_opt_001 | 10.8 | +0.5, -0.4 |
| t_opt_002 | 11.2 | +0.6, -077 |
| ... | ... | |

| OVERALL OPTIMUM PROPOSAL | f | $w_1$ | A | $w_{21}$ | $B_1$ | $w_{22}$ | $B_2$ | $w_{23}$ | $B_3$ | $w_3$ | C | $w_4$ | D |
|---|---|---|---|---|---|---|---|---|---|---|---|---|---|
| t_opt_001 | 117.33 | 10 | 10.5 | 2 | 0.35 | 2 | 0.58 | 2 | 0.42 | 1 | 9 | 3 | 0.21 |
| t_opt_002 | 121.8 | 10 | 11.3 | 2 | 0.24 | 2 | 0.56 | 2 | 0.33 | 1 | 6 | 3 | 0.18 |
| ... | ... | | | | | | | | | | | | |

| | 208a | 208b | 208c | 208d | 208e | 208f |
|---|---|---|---|---|---|---|
| | OPERATOR ID | PROCESS | HANDLED ARTICLE | START TIME | END TIME | OPERATION PLACE |
| | W001 | PROCESS 1 | itemA | 20210628 13:00 | 20210628 13:05 | AREA1 |
| | W002 | PROCESS 2 | itemB | 20210628 14:15 | 20210628 14:25 | AREA2 |
| | W003 | PROCESS 3 | itemC | 20210628 15:05 | 20210628 15:27 | AREA3 |
| | W001 | PROCESS 1 | itemA | 20210628 13:10 | 20210628 13:15 | AREA1 |
| | | | | | | |

| 210a | 210b | 210c | 210d | 210e | 210f |
|---|---|---|---|---|---|
| w1 | w21 | w22 | w23 | w3 | w4 |
| 2.2 | 5 | 3 | 2 | 0.8 | 4.1 |

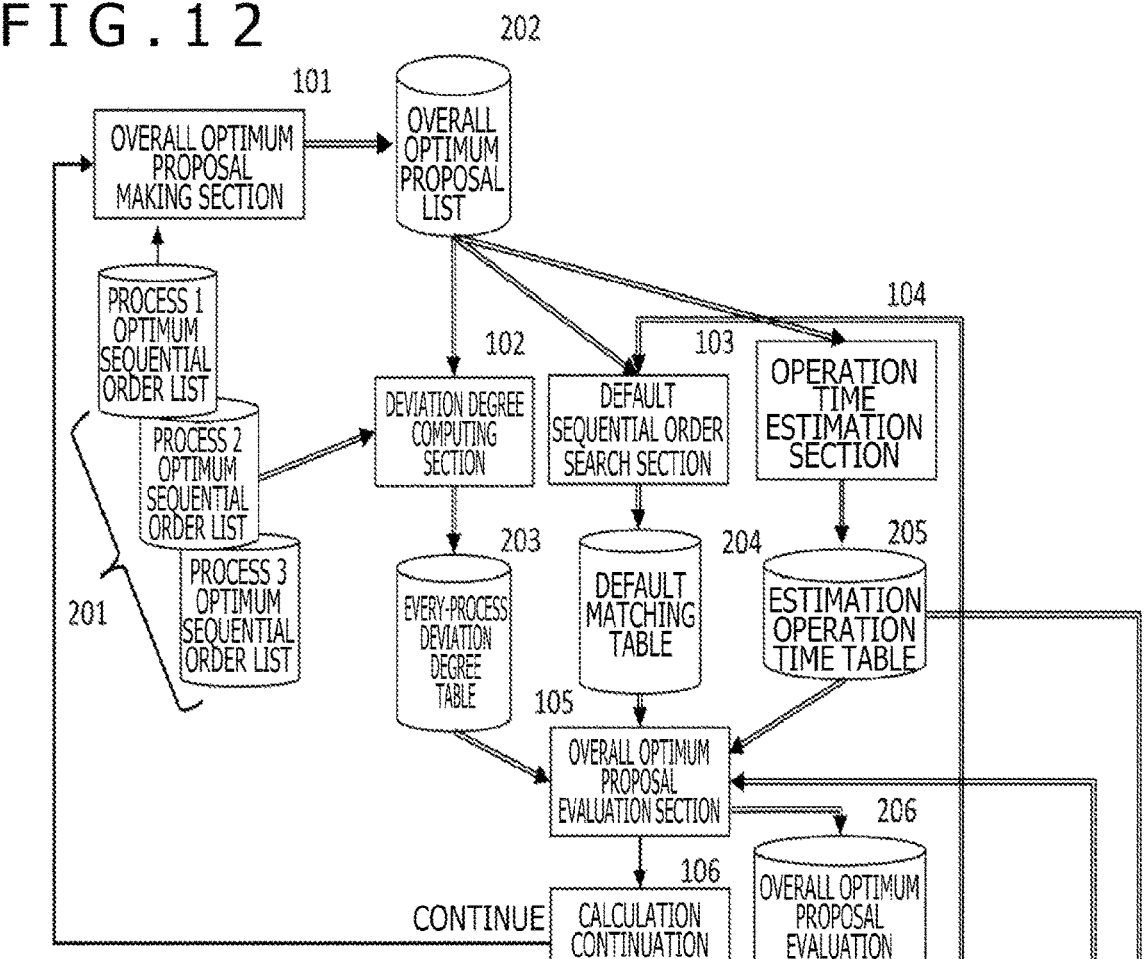

LOGISTICS OPERATION OPTIMIZATION APPARATUS AND LOGISTICS OPERATION OPTIMIZATION METHOD

BACKGROUND OF THE INVENTION

1. Field of the Invention

The present invention relates to a logistics operation optimization apparatus and a logistics operation optimization method, and particularly to a logistics operation optimization apparatus and a logistics operation optimization method suitable to optimize logistics operation in a shipping procedure in a warehouse, improve the throughput in all processes in the shipping procedure, and reduce operation time in the shipping procedure.

2. Description of the Related Art

In recent years, enhancement in efficiency of logistics business is demanded from drastic increase in logistics amount. Systemization has advanced in logistics warehouse business, and there are many cases in which material handling equipment for labor saving and automation of cargo handling business is introduced. Further, various technologies have been developed for reduction in time from acceptance of an order to shipping, which directly leads to customer satisfaction.

In a sequential business flow in a shipping process of logistics warehouse business or the like, articles to be handled are fed in a certain sequential order from the upstream side of the business flow. Supposing a case in which articles are fed in a same sequential order to the end of the business flow in a state in which the sequential order of the articles is kept after it is determined at the beginning of the business flow, such a sequential order of the articles that the business is performed efficiently is outputted. A technology has been proposed conventionally in which such logistics operation in a warehouse as described above is performed in a higher efficiency by an information processing apparatus.

JP-2005-324945-A (referred to as Patent Document 1 hereinafter) discloses a commodity pickup system in which an optimum loading sequential order when commodities are to be packed for individual transfer destinations is determined from location information of storage shelves for commodities, preferential packing turns based on delivery priority degrees, capacity information for individual commodities, and capacity information and stock information of packing boxes. Then, a sequential order in picking of the commodities is determined according to the determined sequential order thereby to achieve enhancement in efficiency of the packing operation.

JP-2001-253515-A (referred to as Patent Document 2 hereinafter) discloses a commodity picking facility in which an operation facility in a warehouse is arranged for individual operation areas such that material handling equipment can move and operate efficiently.

JP-2002-154615-A (referred to as Patent Document 3 hereinafter) discloses an article shipping management system in which operation time in each process in article shipping is formulated and a size of a luggage bundle is optimized and besides automatic optimization of the shipping process is performed to minimize a shipping lead time.

SUMMARY OF THE INVENTION

In Patent Document 1, an optimum loading sequential order when commodities are to be packed for individual transfer destinations is determined from location information of storage shelves for commodities, preferential packing turns based on delivery priority degrees, capacity information for individual commodities, and capacity information and stock information of packing boxes. Then, a sequential order in picking of the commodities is determined according to the determined sequential order thereby to achieve enhancement in efficiency of the packing operation. However, if a commodity picking sequential order is determined, taking only the enhancement of efficiency of the packing operation into consideration by the technology disclosed in Patent Document 1, then the operation efficiency is degraded in processes other than the packing process, and there is a possibility that the operation time may not be reduced in the entire shipping process.

In Patent Document 2, an operation facility in a warehouse is arranged for individual operation areas such that material handling equipment can move and operate efficiently. However, in a warehouse currently in operation, the cost and time are sometimes required for application of the technology, and there is a possibility that, in a case in which it is intended to apply the technology disclosed in Patent Document 2 to achieve reduction of operation time in a shipping process, by utilizing facilities such as a system and a material handling apparatus currently in operation, it may be difficult to apply the technology.

In general, in order to implement multipurpose optimization in a logistics business in a warehouse, constraints and objective functions of individual process businesses may be required be recognized. However, there are many cases in which different vendor systems or material handling equipment are introduced in one logistics warehouse. In this case, since certain material handling equipment of a vendor cannot perform linkage of information with another material handling equipment of another vendor and constraints, objective functions and so forth of a business are unknown, multipurpose optimization cannot be achieved.

Further, even if an operation plan for reducing the time in a shipping process is made as in Patent Document 1 or Patent Document 3 and is presented to a site, the operation plan cannot be performed as it is from a certain cause and there is a possibility that actual business time may be extended from business time supposed upon plan making.

It is an object of the present invention to provide a logistics operation optimization apparatus and a logistics operation optimization method suitable to optimize logistics operation in a shipping procedure in a warehouse, improve the throughput in all processes of the shipping procedure, and reduce operation time in the shipping procedure.

According to an aspect of the present invention, there is preferably provided a logistics operation optimization apparatus that performs optimization regarding a sequential order of articles for performing operation in regard to the articles in each operation process to sequentially distribute the articles, the logistics operation optimization apparatus including:

a deviation degree computing section that computes, on the basis of an overall optimum proposal list indicative of overall optimum proposals in which optimum turns of the articles over entire logistics operation are lined up and of an every-process optimum sequential order list in which optimum turns of the articles in each operation process are lined up, for each operation process, a deviation degree between the turns of the articles indicated by the overall optimum proposal list and the turns of the articles in each operation process;

an operation time estimation section that obtains estimation operation time from the overall optimum proposal indicated by the overall optimum proposal list;

an overall optimum proposal evaluation section that obtains an evaluation value of the overall optimum proposal indicated by the overall optimum proposal list according to an evaluation expression that is based on the deviation degree computed by the deviation degree calculation section between the turns of the articles indicated by the overall optimum proposal list and the turns of the articles in each operation process, and the estimation operation time obtained by the operation time estimation section; and an overall optimum plan determination section that creates an overall optimum plan list indicative of an overall optimum plan that is determined on the basis of the evaluation value of the overall optimum proposal obtained by the overall optimum proposal evaluation section and in which optimum turns of the articles over the entire logistics operation are lined up.

According to the present invention, a logistics operation optimization apparatus and a logistics operation optimization method can be provided which are suitable to optimize logistics operation in a shipping procedure in a warehouse, improve the throughput in all processes of the shipping procedure, and reduce operation time in the shipping procedure.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 4 is a view depicting an example of an overall optimum proposal list;

FIG. 5 is a view depicting an example of an every-process deviation degree table;

FIG. 6 is a view depicting an example of a default information list table;

FIG. 7 is a view depicting an example of a default matching table;

FIG. 8 is a view depicting an example of an estimation operation time table;

FIG. 9 is a view depicting an example of an overall optimum proposal evaluation value table;

FIG. 10 is a view depicting an example of a site operation history table;

FIG. 11 is a view depicting an example of a weight data table;

FIG. 12 is a view depicting processing and data flows of the logistics operation optimization apparatus in the embodiment 1;

FIG. 13 is a view depicting article sequential orders indicated by an overall optimum plan and a site operation history in each process;

DESCRIPTION OF THE PREFERRED EMBODIMENTS

In the following, embodiments of the present invention are described with reference to FIGS. 1 to 15.

Embodiment 1

First, an embodiment 1 of the present invention is described with reference to FIGS. 1 to 13.

The present embodiment is directed to a technology for optimizing operations in a shipping procedure in logistics operation, which is configured from a plurality of processes from picking to shipping in response to reception of a shipping instruction (acceptance of an order) at a logistics warehouse, by creating a plan indicative of a handled commodity sequential order that provides a better throughput as a whole, taking operation contents in the individual processes into consideration, supposing a situation in which a commodity handling sequential order determined at the beginning of the shipping procedure is kept as it is to the end of the shipping procedure. Such a plan as described above is hereinafter referred to as an "overall optimum plan."

First, processes in logistics warehouse business are described with reference to FIG. 1.

Figure 1:
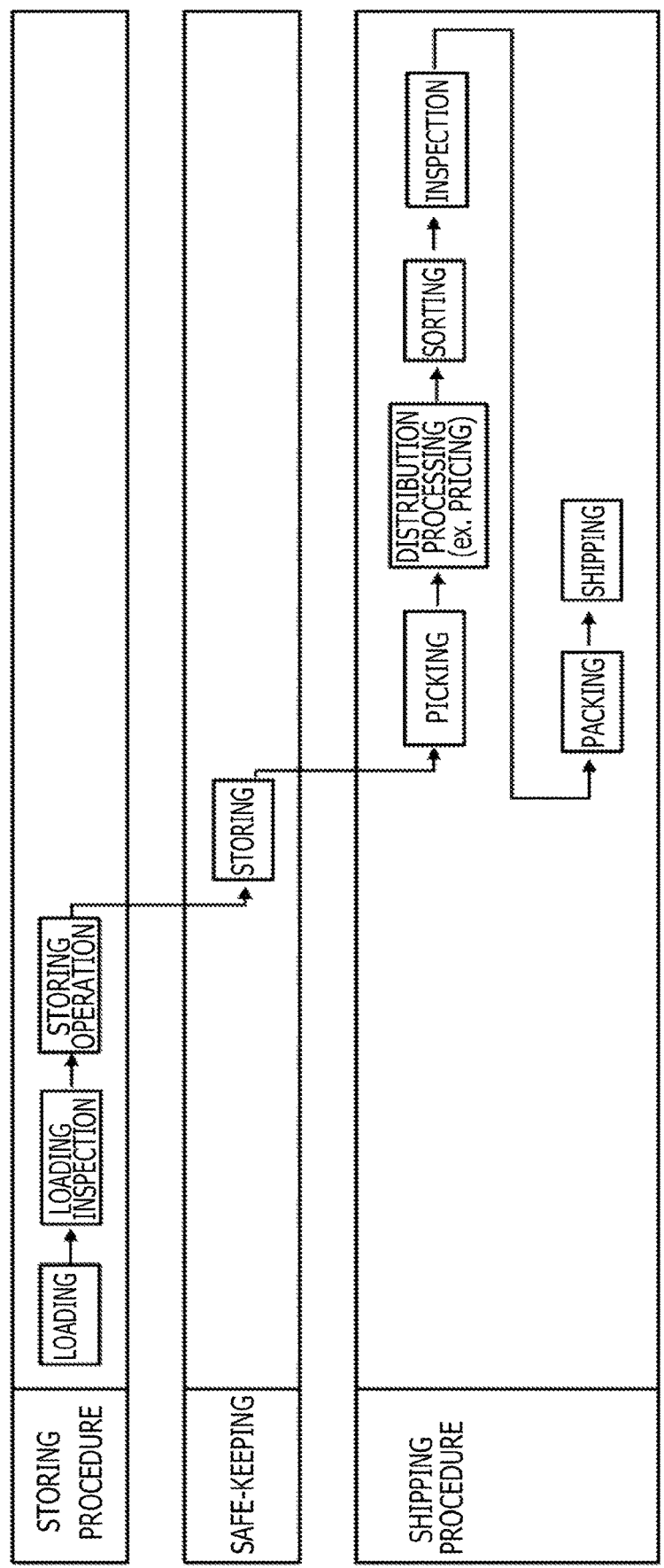
FIG. 1 is a view illustrating processes in a logistics warehouse business.

The logistics warehouse business is roughly divided into a storing procedure, safe-keeping, and a shipping procedure as depicted in FIG. 1. Further, for example, the storing procedure includes processes for loading, loading inspection, and storing operation. The storage includes a step for storing. The shipping procedure includes processes for picking, distribution processing, sorting, inspection, packing, and shipping.

In the logistics warehouse business, many kinds of commodities are fed such that operations in the processes are performed sequentially, and it is demanded finally that the total time period from loading to final shipping is reduced.

However, there is a problem that, even if the time period is reduced, focusing on the individual processes, the time period over all processes from loading to final shipping cannot necessarily be reduced.

For example, in the process for distribution processing (for example, pricing), succession of products of a same price is efficient. Meanwhile, in the process for sorting, succession of products of a same distribution destination is efficient.

Accordingly, if the commodity sequential order in distribution is set to an optimum sequential order for pricing, then there is a possibility that the sequential order may be inappropriate for the sorting process. In particular, since it is delayed that products become available for individual delivery destinations, there is a possibility that start of the inspection operation in the next process may be delayed, and there is a possibility that the overall shipping time may be delayed.

On the other hand, if the commodity sequential order in distribution is set to an optimum sequential order for sorting, then there is a possibility that the sequential order may be inappropriate for the pricing operation. Therefore, there is a possibility that the flow of products after pricing may degrade and the operation time period for the inspection operation may become longer (gap time is generated), resulting in a possibility that the overall shipping time may be delayed.

The present embodiment is directed to a technology for finding out such balance in commodity sequential order in distribution that the overall operation ending time comes earlier by moderating the bottleneck of the flow of products and preventing the operation time period for each process from becoming excessively long, taking it into consideration that the operability and the efficiency of the commodity sequential order in distribution are different in each process in such a manner as described above.

Further, in this case, it also becomes necessary to take the reality of operations on actual sites into consideration.

Now, a configuration of the logistics operation optimization apparatus according to the embodiment 1 is described with reference to FIGS. 2 and 3.

Figure 2:
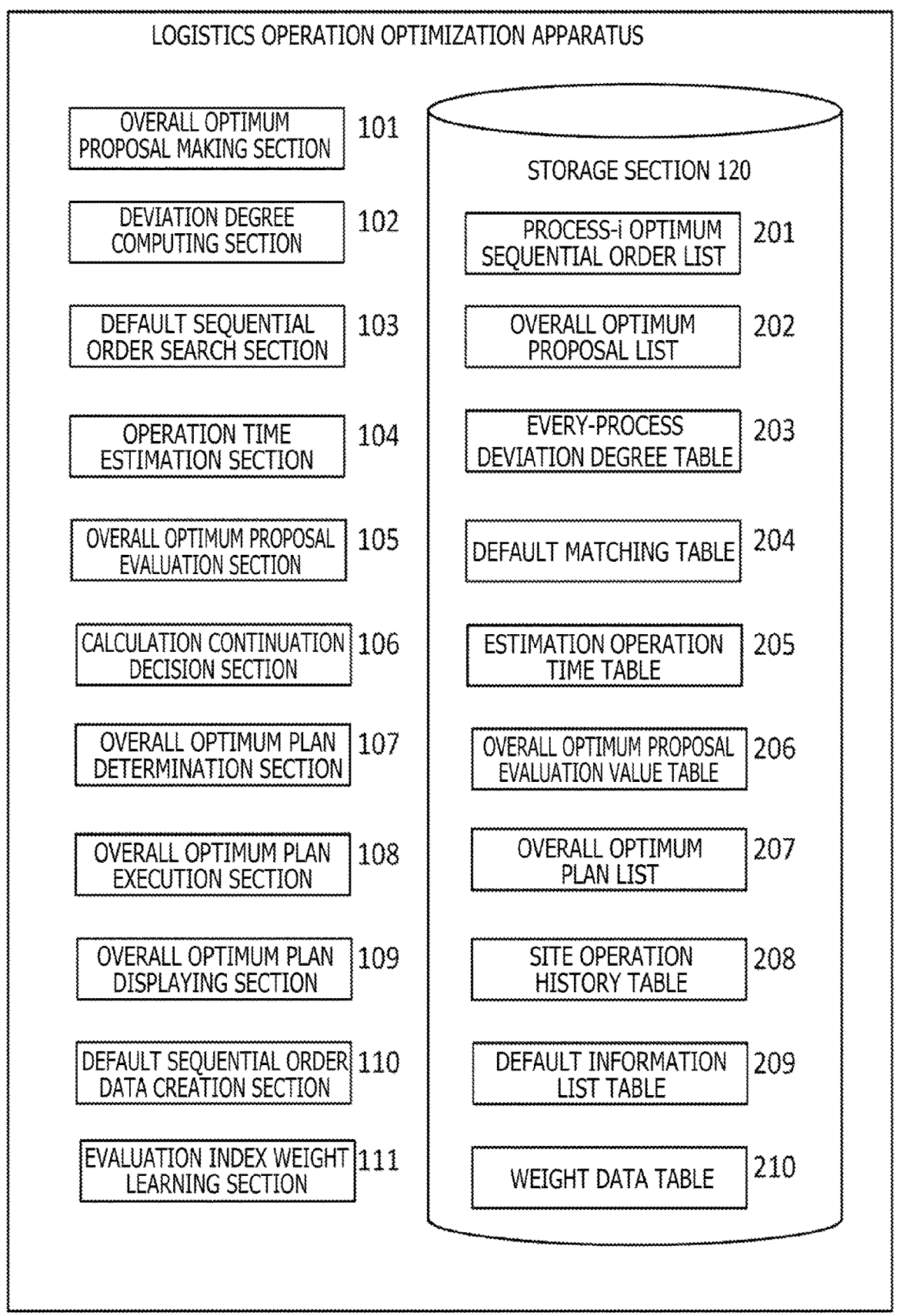
FIG. 2 is a functional block configuration diagram of a logistics operation optimization apparatus according to an embodiment 1.

Referring first to FIG. 2, the logistics operation optimization apparatus 100 includes an overall optimum proposal making section 101, a deviation degree computing section 102, a default sequential order search section 103, an operation time estimation section 104, an overall optimum proposal evaluation section 105, a calculation continuation decision section 106, an overall optimum plan determination section 107, an overall optimum plan execution section 108, an overall optimum plan displaying section 109, a default sequential order data creation section 110, an evaluation index weight learning section 111, and a storage section 120.

The overall optimum proposal making section 101 is a functioning section that makes an optimum proposal for an article sequential order in a warehouse logistics business (hereinafter referred to also as an "overall optimum proposal"). The deviation degree computing section 102 is a functioning section that calculates a deviation degree between an overall optimum proposal and an optimum sequential order in each process. It is to be noted that details of the deviation degree are hereinafter described. The default sequential order search section 103 is a functioning section that searches whether or not an overall optimum proposal includes an article sequential order pattern that is not operated according to a plan on the basis of operation information on a site. The operation time estimation section 104 is a functioning section that estimates operation time in each process. The overall optimum proposal evaluation section 105 is a functioning section that evaluates, on the basis of an evaluation index, an overall optimum proposal created. Details of the evaluation index are hereinafter described. The calculation continuation decision section 106 is a functioning section that decides whether or not calculation of a loop for obtaining an overall optimum plan from an overall optimum proposal is to be continued. The overall optimum plan determination section 107 is a functioning section that determines an overall optimum plan from an overall optimum proposal, on the basis of calculated information. The overall optimum plan execution section 108 is a functioning section that performs execution of an overall optimum plan determined in a warehouse logistics business. For example, the overall optimum plan execution section 108 has a function for transmitting an instruction or data to a logistics robot. The overall optimum plan displaying section 109 has a functioning section for displaying a calculated overall optimum plan. The default sequential order data creation section 110 is a functioning section that creates data relating to an article sequential order that becomes default on a site, in light of an overall optimum plan. The evaluation index weight learning section 111 is a functioning section that learns a weight for an evaluation index, on the basis of a certain learning model. It is to be noted that details of the weight for an evaluation index are hereinafter described. The storage section 120 is a functioning section that stores work data, tables, and lists that are used in the logistics operation optimization apparatus 100 of the present embodiment.

The logistics operation optimization apparatus 100 of the present embodiment has stored therein a process-i (i=1, 2, 3, . . . ) optimum sequential order list 201, an overall optimum proposal list 202, an every-process deviation degree table 203, a default matching table 204, an estimation operation time table 205, an overall optimum proposal evaluation value table 206, an overall optimum plan list 207, a site operation history table 208, a default information list table 209, and a weight data table 210.

It is to be noted that details of the lists and tables are hereinafter described.

Now, a hardware and software configuration of the logistics operation optimization apparatus 100 is described with reference to FIG. 3.

Figure 3:
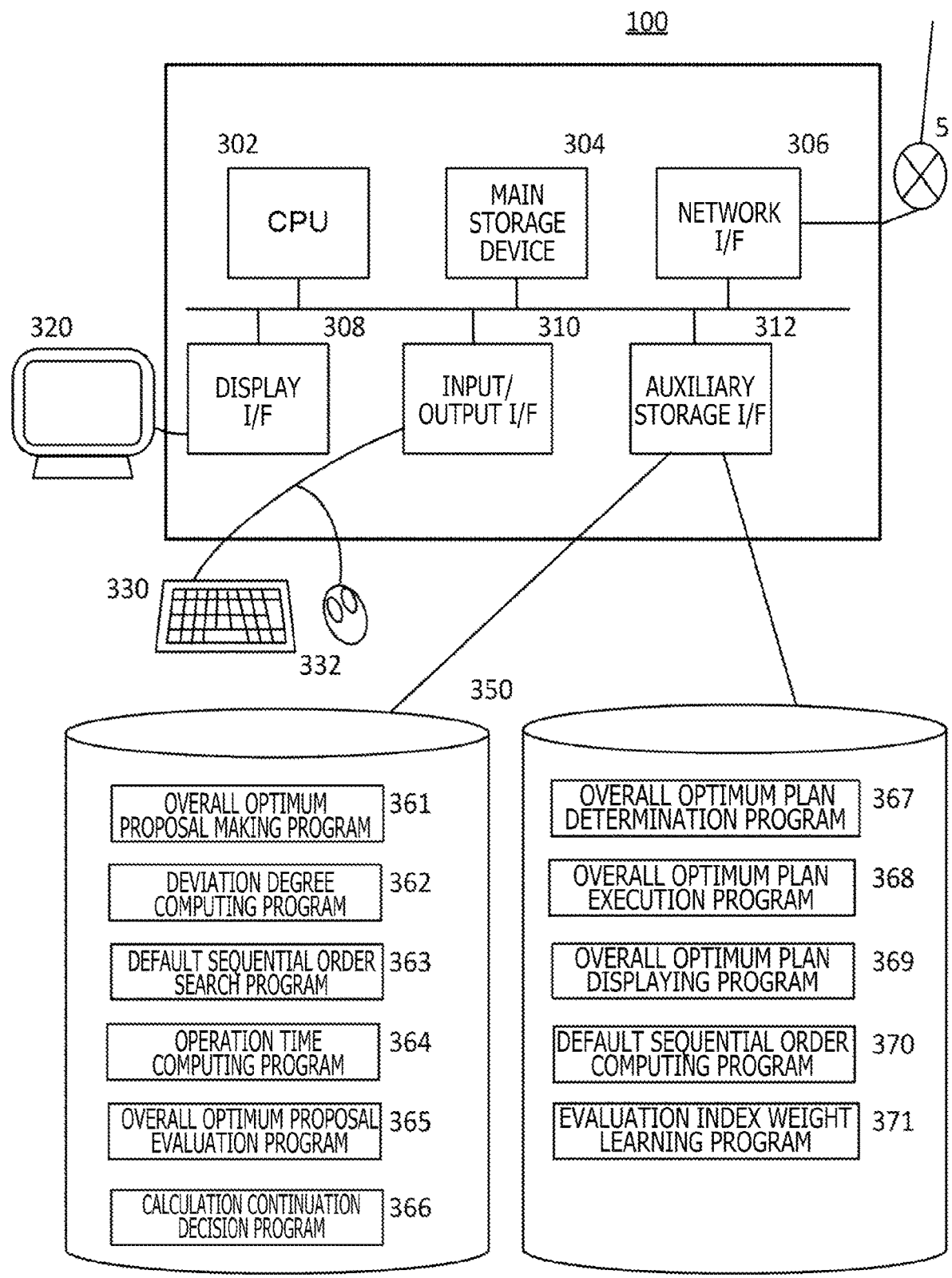
FIG. 3 is a block diagram depicting a hardware and software configuration of the logistics operation optimization apparatus according to the embodiment 1.

The hardware configuration of the logistics operation optimization apparatus 100 is implemented by such a typical information processing apparatus as, for example, a personal computer depicted in FIG. 3.

The logistics operation optimization apparatus 100 is formed such that a central processing unit (CPU) 302, a main storage device 304, a network (interface) I/F 306, a display I/F 308, an input/output I/F 310, and an auxiliary storage I/F 312 are coupled to each other by a bus.

The CPU 302 controls the components of the logistics operation optimization apparatus 100, and loads a necessary program into the main storage device 304 and executes the program.

The main storage device 304 is configured normally from a volatile memory such as a random access memory (RAM) and stores programs to be executed by the CPU 302 and data to be referred to.

The network I/F 306 is an interface for connecting to a network 5.

The display I/F 308 is an interface for connecting a display device 320 such as a liquid crystal display (LCD).

The input/output I/F 310 is an interface for connecting inputting and outputting devices. In the example depicted in FIG. 3, a keyboard 330 and a mouse 332 as a pointing device are connected.

The auxiliary storage I/F 312 is an interface for connecting an auxiliary storage device such as a hard disk drive (HDD) 350 or a solid state drive (SSD).

The HDD 350 has a large storage capacity and has stored therein programs for executing processing of the present embodiment. The logistics operation optimization apparatus 100 has installed therein an overall optimum proposal making program 361, a deviation degree computing program 362, a default sequential order search program 363, an operation time computing program 364, an overall optimum proposal evaluation program 365, a calculation continuation decision program 366, an overall optimum plan determination program 367, an overall optimum plan execution program 368, an overall optimum plan displaying program 369, a default sequential order computing program 370, and an evaluation index weight learning program 371.

The overall optimum proposal making program 361, deviation degree computing program 362, default sequential order search program 363, operation time computing program 364, overall optimum proposal evaluation program 365, calculation continuation decision program 366, overall optimum plan determination program 367, overall optimum plan execution program 368, overall optimum plan displaying program 369, default sequential order computing program 370, and evaluation index weight learning program 371 are programs for implementing functions of the overall optimum proposal making section 101, deviation degree computing section 102, default sequential order search section 103, operation time estimation section 104, overall optimum proposal evaluation section 105, calculation continuation decision section 106, overall optimum plan determination section 107, overall optimum plan execution section 108, overall optimum plan displaying section 109, default sequential order data creation section 110, and evaluation index weight learning section 111, respectively.

Further, though not depicted in FIG. 3, the HDD 350 has stored therein the process-i (i=1, 2, 3, . . . ) optimum sequential order list 201, overall optimum proposal list 202, every-process deviation degree table 203, default matching table 204, estimation operation time table 205, overall optimum proposal evaluation value table 206, overall optimum plan list 207, site operation history table 208, default information list table 209, and weight data table 210.

Now, a data structure used in the logistics operation optimization apparatus of the embodiment 1 is described with reference to FIGS. 4 to 11.

The overall optimum proposal list 202 is a list of overall optimum proposals to be presented as optimum proposals for a sequential order of articles in a shipping process by the logistics operation optimization apparatus 100 and is structured such that article identifications (IDs) (item A, item B, . . . ) of articles to be fed in the shipping process as depicted in FIG. 4 are lined up sequentially. Though not depicted, to an overall optimum proposal indicated by each of the overall optimum proposal lists 202, an overall optimum proposal ID for identifying each proposal uniquely is assumed to be assigned.

It is to be noted that the process-i optimum sequential order list 201 is a list of sequential orders of articles, which are computed for each process i and for which an operation is estimated to be optimum for the process, and has a structure same as that of the overall optimum proposal list 202.

The every-process deviation degree table 203 is a table that retains deviation degrees from overall optimum proposals for each process-i optimum sequential order list. As depicted in FIG. 5, the every-process deviation degree table 203 has fields of an overall optimum proposal field 203a, a process field 203b, and a deviation degree field 203c.

In the overall optimum proposal field 203a, IDs indicative of overall optimum proposals are stored. In the process field 203b, IDs of processes are stored. In the deviation degree field 203c, deviation degrees between the overall optimum proposals indicated in the overall optimum proposal field 203a and the process-i optimum sequential order lists indicated in the process field 203b are stored. It is to be noted that how to compute a deviation degree is hereinafter described.

The default information list table 209 is a table that retains information relating to cases in which, in comparison with the overall optimum proposals having been presented so far, the article sequential order is different at a fixed ratio between an operation history in a site and the overall optimum proposals. As depicted in FIG. 6, the default information list table 209 includes fields of a case ID field 209a, an overall proposal operation sequential order field 209b, and a site operation sequential order field 209c.

In the case ID field 209a, IDs that uniquely indicate cases are stored. In the overall proposal operation sequential order field 209b, a sequential order of the articles that has not been performed in light of the site operation history in the overall optimum proposals are stored. In the site operation sequential order field 209c, the article sequential orders indicated by the actual site operation history in a case where they have not been performed in light of the site operation history in the overall optimum proposals are stored.

For example, in a case in which the case ID field 209a indicates "0010," a case is recorded in which, when the article sequential order is from item B to item C in an overall optimum proposal, in the site operation history, operation has been performed in the article sequential order from item C to item B at the ratio of 80/100.

The default matching table 204 is a table that retains points in which unmatched events recorded in the default information list table 209 have occurred in comparison with overall optimum proposals. As depicted in FIG. 7, the default matching table 204 includes fields of an overall optimum proposal field 204a and a default matching point field 204b.

In the overall optimum proposal field 204a, IDs indicative of overall optimum proposals are stored. In the default matching point field 204b, points in which unmatched events recorded in the default information list table 209 in the overall optimum proposals indicated by the overall optimum proposal field 204a have occurred are stored. The point has a significance that, as it increases, the number of unmatched events in the site operation increases.

The estimation operation time table 205 is a table that retains information relating to estimation operation time in an overall optimum proposal. As depicted in FIG. 8, the estimation operation time table 205 includes fields of an overall optimum proposal field 205a, an estimation operation time field 205b, and an error field 205c. In the overall optimum proposal field 205a, IDs indicative of overall optimum proposals are stored. In the estimation operation time field 205b, estimation operation time for overall optimum proposals indicated by the operation time estimation section 104 are stored. In the error field 205c, upper limit values and lower limit values of a reliable section, for example, 90%, in a case in which estimation operation time indicated by the operation time estimation section 104 is to be estimated statistically are stored. For example, in the example depicted in FIG. 8, it is indicated that, when the overall optimum proposal field 205a indicates "t_opt_001," the estimation operation time is "10.8 hours" and the upper limit value of the reliable section 90% is "+0.5" while the lower limit value is "−0.4."

The overall optimum proposal evaluation value table 206 is a table that retains information relating to a value relating to an evaluation index. As depicted in FIG. 9, the overall optimum proposal evaluation value table 206 includes fields of an overall optimum proposal field 206a, an f field 206b, a $W_1$ field 206c, an A field 206d, a $W_{21}$ field 206e, a $B_1$ field 206f, a $W_{22}$ field 206g, a $B_2$ field 206h, a $W_{23}$ field 206i, a $B_3$ field 206j, a $W_3$ field 206k, a C field 206l, a $W_4$ field 206m, and a D field 206n. In the overall optimum proposal field 206a, IDs indicative of overall optimum proposals that become an object of computation of an evaluation index are stored. In each of the f field 206b, $W_1$ field 206c, A field 206d, $W_{21}$ field 206e, $B_1$ field 206f, $W_{22}$ field 206g, $B_2$ field 206h, $W_{23}$ field 206i, $B_3$ field 206j, $W_3$ field 206k, C field 206l, $W_4$ field 206m, and D field 206n, a value of a corresponding evaluation index is stored. It is to be noted that details of the evaluation index are hereinafter described.

The site operation history table 208 is a table that retains history data on a site of warehouse operation. As depicted in FIG. 10, the site operation history table 208 includes fields of an operator ID field 208a, a process field 208b, a handled article field 208c, a start time field 208d, an end time field 208e, and an operation place field 208f. In the operator ID field 208a, IDs for uniquely identifying operators are stored. In the process field 208b, IDs for uniquely identifying processes of the operation are stored. In the handled article field 208c, IDs of articles handled in the operation in the processes are stored. In the start time field 208d, time at which the operation is started is stored in the format of yyyymmddmm. In the end time field 208e, time at which the operation is completed is stored in the format of yyyymmddmm. In the operation place field 208f, names indicative of places where the operation is performed or IDs for uniquely identifying places at which the operation is performed are stored.

The weight data table 210 is a table that retains weight data for an evaluation index in individual processes. As depicted in FIG. 11, the weight data table 210 includes fields of a $W_1$ field 210a, a $W_{21}$ field 210b, a $W_{22}$ field 210c, a $W_{23}$ field 210d, a $W_3$ field 210e, and a $W_4$ field 210f. In the $W_1$ field 210a, $W_{21}$ field 210b, $W_{22}$ field 210c, $W_{23}$ field 210d, $W_3$ field 210e, and $W_4$ field 210f, values of weights $W_1$, $W_{21}$, $W_{22}$, $W_{23}$, $W_3$, and $W_4$ for an evaluation index are placed, respectively. Details of the weight for an evaluation index are hereinafter described.

Now, processing of the logistics operation optimization apparatus according to the embodiment 1 are described with reference to FIGS. 12 and 13.

In the following, description is given on the basis of flows depicted in FIG. 12, as needed, with reference to the figures referred to in the foregoing description.

In the description of the present embodiment, an example in which three shipping processes represented as process 1, process 2, and process 3 are involved is described. However, the number of processes in a warehouse logistics business may be optional.

First, the overall optimum proposal making section 101 of the logistics operation optimization apparatus 100 creates one or a plurality of overall optimum proposal lists 202 depicted in FIG. 4, on the basis of the process-i (i=1, 2, 3, . . . ) optimum sequential order lists 201.

As an example of a method for preparing the overall optimum proposal list 202, a method is available in which a process-i optimum sequential order list 201 created by each individual process system is set as initial parent data first and then overall optimum proposals are made, using a genetic algorithm (GA), while characteristics of an overall optimum proposal list that is highly evaluated in terms of an evaluation index (hereinafter described) are inherited. Further, although convergence to an overall optimum plan may be delayed, a method for preparing the list fully at random may be applied.

Here, the preparation method of the process-i optimum sequential order list 201 is such that, for example, in a process of attaching a price tag to an article, a sequential order in which articles of the same price successively appear is determined as an optimum sequential order, or, as another example, in a process of packing articles for individual shipping destinations, a sequential order in which articles of the same shipping destination successively appear is determined as an optimum sequential order.

Then, the deviation degree computing section 102 computes a deviation degree between an optimum sequential order in one process and an article sequential order in one overall optimum proposal on the basis of the overall optimum proposal list 202 and the process-i optimum sequential order list 201 and stores the computed deviation degree into the every-process deviation degree table 203 depicted in FIG. 5.

A deviation degree D between the article sequential order of the process-i optimum sequential order list 201 and the article sequential order of the overall optimum proposal list 202 is indicated by the expression 1 given below.

Although the Spearman's rank correlation coefficient assumes a value from −1 to +1, the deviation degree in the present embodiment is set such that a value range of the Spearman's rank correlation coefficient is processed so as to assume a value from 0 to +1 and a reciprocal of the value is set as the value of the Spearman's rank correlation coefficient.

[Math. 1]

$$D = \frac{2}{S+1} = \frac{N^3 - N}{N^3 - N - 3\sum_{j=1}^{N} D_j^2} \quad \text{(expression 1)}$$

Here, S is a Spearman's rank correlation coefficient, N is a quantity of articles in a warehouse business (equal to the entry number of lists indicated by the process-i optimum sequential order lists 201 and the overall optimum proposal lists 202), and $D_j$ is a difference between ranks in which the process-i optimum sequential order list 201 and the overall optimum proposal list 202 appear for each article. In the numerator of the expression 1, $D_j$ takes the square sum of differences in rank over all articles.

Then, the default sequential order search section 103 searches whether or not the overall optimum proposal includes an article sequential order pattern that is not operated according to a plan on the basis of information of article sequential order patterns, which are not operated according to a plan in sites indicated by the default information list table 209 depicted in FIG. 6, and the overall optimum proposal list 202. Then, the default sequential order search section 103 converts the degree of matching with an article sequential order pattern that is not operated according to a plan into a point, and calculates such points of default matching for the individual overall optimum proposals and stores them into the default matching table 204 depicted in FIG. 7.

Then, the operation time estimation section 104 computes operation estimation time relating to an article sequential order indicated by the overall optimum proposal list 202 and stores the operation estimation time into the estimation operation time table 205 depicted in FIG. 8 together with an error that possibly occurs. The operation time estimation section 104 may statistically compute the operation time of logistics operation in a warehouse through a method of deep learning or may compute it by integrating each operation time. It is to be noted that, as a reference document of the technology for computing estimation operation time, JP-2020-177111-A is available.

Then, the overall optimum proposal evaluation section 105 evaluates the overall optimum proposal indicated by the overall optimum proposal list 202 by use of the evaluation index according to the evaluation expression of the expression 2 given below, on the basis of the every-process deviation degree table 203 depicted in FIG. 5, default matching table 204 depicted in FIG. 7, estimation operation time table 205 depicted in FIG. 8, and weight data table 210 depicted in FIG. 11. It is evaluated that an overall optimum proposal with regard to which "f" indicated by the expression 2 has a lower value is a better plan in which the total operation time becomes shorter.

[Math. 2]

$$f = w_1 A + w_{21} B_1 + w_{22} B_2 + w_{23} B_3 + w_3 C + w_4 D \quad \text{(expression 2)}$$

Here, the following definitions are applied.

A: value in the error field 205c of the estimation operation time table 205 of FIG. 8

$B_i$: value in the deviation degree field 203c of the every-process deviation degree table 203 of FIG. 5: the suffix i is variable by the number of processes (in the present embodiment, the suffix i can be varied in a range from 1 to 3)

C: value in the default matching point field 204b of the default matching table 204 of FIG. 7

D: width between an upper limit error and a lower limit error indicated in the error field 205c of the estimation operation time table 205 of FIG. 8

It is to be noted that $w_j$ (in the present embodiment, j=1, 21, 22, 23, 3, 4) is a weight coefficient for each of terms that are not negative and has a value in the weight data table 210 of FIG. 11.

Then, the overall optimum proposal evaluation section 105 stores a parameter corresponding to the value of the evaluation expression of the expression 2 into each corresponding one of the fields of the overall optimum proposal evaluation value table 206 depicted in FIG. 9.

Then, the calculation continuation decision section 106 decides whether or not a threshold value for the time taken for creating overall optimum plans set by the user or the loop count is reached. If the threshold value is not reached, then the processing returns to the processing of the overall optimum proposal making section 101, but if the threshold value is reached, then the processing advances to the processing of the overall optimum plan determination section 107.

Then, the overall optimum plan determination section 107 determines the overall optimum proposal indicated by a record stored in the $W_{23}$ field 206i and indicting the lowest value of f as an overall optimum plan relating to the sequential order of the article, on the basis of the overall optimum proposal evaluation value table 206 of FIG. 9, and stores the determined overall optimum plan into the overall optimum plan list 207.

Then, the overall optimum plan execution section 108 issues a command of a handled article sequential order, for example, to a robot or the like in order to perform the overall optimum plan indicated by the overall optimum plan list 207 on a site. Further, the overall optimum plan displaying section 109 causes a terminal display such as a handy terminal of an operator to display the handled article sequential order indicated by the overall optimum plan list 207.

Then, the default sequential order data creation section 110 computes, on the basis of the overall optimum plan indicated by the overall optimum plan list 207 and the site operation history table 208, from among patterns of a sequential order of articles in an overall optimum plan, one pattern that indicates a high ratio at which the pattern of a sequential order of a certain article in the overall optimum plan is replaced into a pattern of a sequential order of a different article.

FIG. 13 depicts article sequential orders indicated by an overall optimum plan and a site operation history in each process, in comparison. For example, in the example depicted in FIG. 13, it is indicated that the overall optimum plan indicates that the article sequential order transits like "item A→item B→item C→item G→ . . . " and the article sequential order indicated by the site operation history in the process 1 is "item A→item C→item B→item G→ . . . ."

Although the article sequential order has item B and item C of the overall optimum plan successively arranged, in the site operation history of the process 1, they are replaced between item C and item B. In a case where this replacement occurs at a ratio determined in advance, for example, at a ratio equal to or higher than 80%, in this article sequential order, "item B→item C" is recorded into the value of the overall proposal operation sequential order field 209b, while "item C→item B" is recorded into the site operation sequential order field 209c, as in a case in which the case ID field 209a of the default information list table 209 of FIG. 6 is "0010."

The evaluation index weight learning section 111 learns weights $w_j$ (j=21, 22, 23, 3) that reduce the evaluation value of f of the expression 2 when an executed overall optimum plan is evaluated from deviation degrees calculated from the overall optimum plans indicated by the overall optimum plan list 207 and the article sequential orders for every process obtained from the site operation history table 208 and default matching points. Then, the evaluation index weight learning section 111 stores the learned weights $w_j$ into the weight data table 210 depicted in FIG. 11.

Further, the evaluation index weight learning section 111 learns weights $w_j$ (j=1, 4) when the executed overall optimum plan is evaluated from the overall optimum plans indicated by the overall optimum plan list 207, estimation operation time of the estimation operation time table 205, and width between the upper limit error and the lower limit error, and further learns the weights $w_j$ that reduce the evaluation value of f of the expression 2.

Then, the evaluation index weight learning section 111 stores the learned weights $w_j$ into the weight data table 210 depicted in FIG. 11.

However, upon learning, a constraint is set such that the sum of the weights $w_j$ (j=1, 21, 22, 23, 3, 4) is a fixed value E on the basis of the expression 3 given below.

[Math. 3]

$$w_1 + w_{21} + w_{22} + w_{23} + w_3 + w_4 = E \quad \text{(expression 3)}$$

As described above, according to the embodiment 1 of the present invention, the throughput in all processes in a logistics warehouse is enhanced, and even if the system for each process is a black box, an overall optimum plan can be created, while the systems remain black boxes. Further, an article sequential order plan that can be executed easily in a site can be created. Therefore, it is expected that, in logistics operation in a warehouse, operations can be performed in expected optimum operation time according to the overall optimum plan.

Embodiment 2

Figure 14:
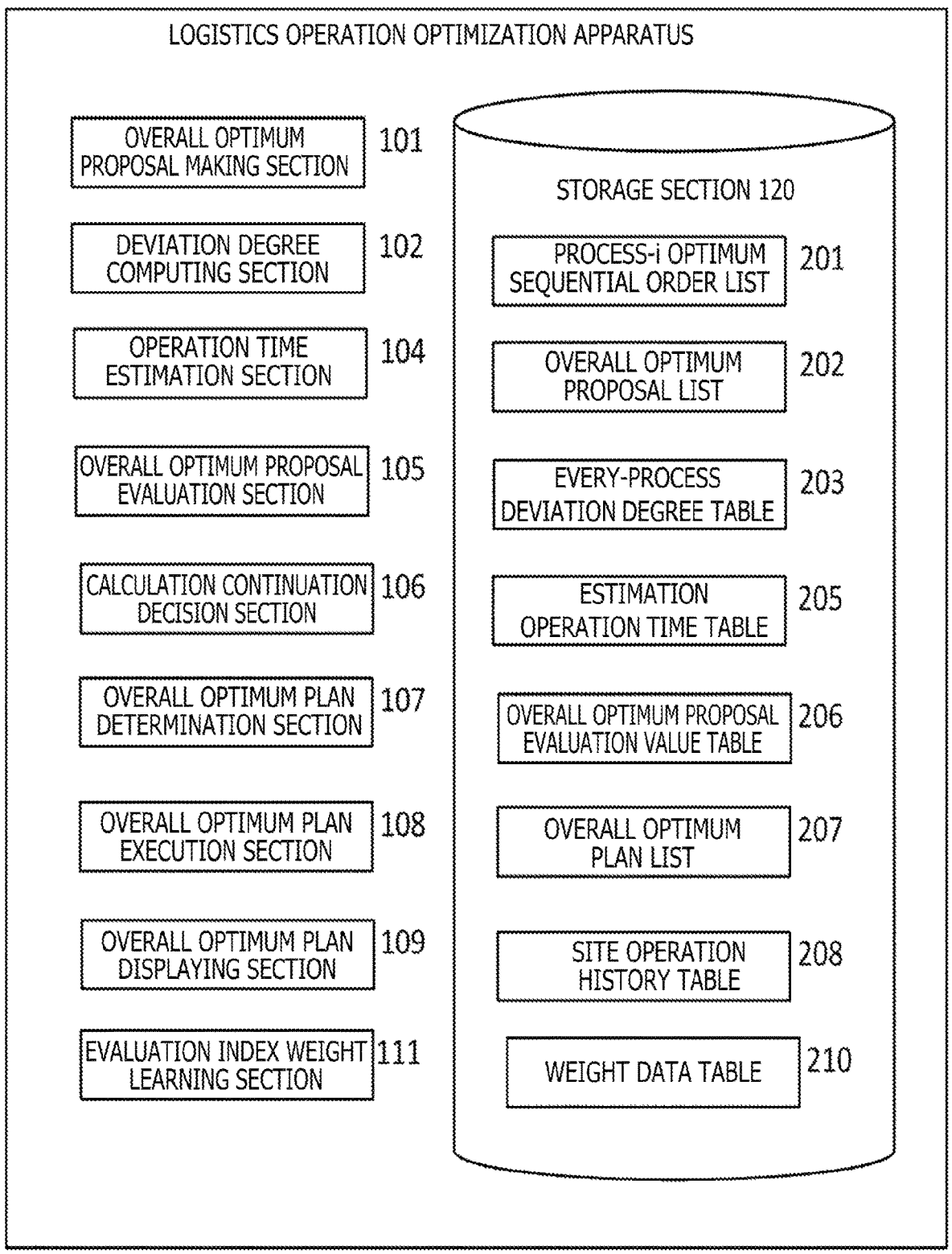
FIG. 14 is a block diagram depicting functional configuration of a logistics operation optimization apparatus according to an embodiment 2.
Figure 15:
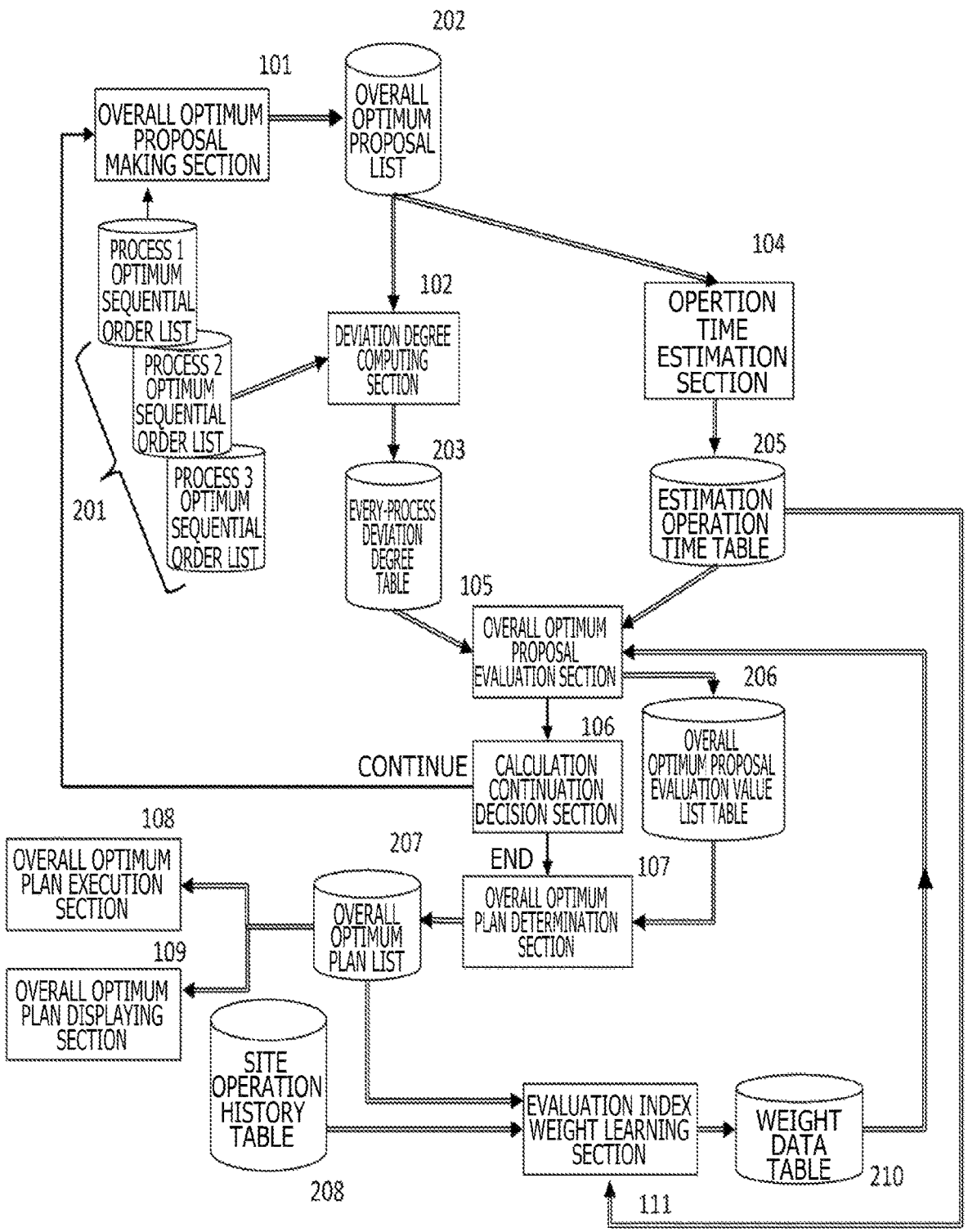
FIG. 15 is a diagram depicting processing and data flows of the logistics operation optimization apparatus in the embodiment 2.

In the following, an embodiment 2 of the present invention is described with reference to FIGS. 14 and 15.

The embodiment 1 described above is directed to a logistics operation optimization apparatus that optimizes an article sequential order in operation of a logistics warehouse to optimize the logistics operation and reduce the time from shipping instruction (order reception) to shipping.

In the embodiment 1, the number of times by which inconsistency (default) between an overall optimum proposal and each process occurs is counted and incorporated into an evaluation expression (term C of the expression 2). This is because, in a shipping business of a warehouse, it possibly occurs that the sequential order of an article to be handled is changed by an intention or a judgment of an operator.

However, it is not normally possible that, on a production line in a factory, the sequential order in which a part or a product is fed is changed by an intention of an operator.

Assuming this as a premise, the present embodiment is described below, focusing on differences of the logistics operation optimization apparatus 100 in a production line in a factory from the embodiment 1.

First, a configuration of the logistics operation optimization apparatus according to the embodiment 2 is described with reference to FIG. 14.

The functional configuration of the logistics operation optimization apparatus 100 of the present embodiment is substantially similar to that of the logistics operation optimization apparatus 100 of the embodiment 1 depicted in FIG. 2. However, as the functioning sections, the logistics operation optimization apparatus 100 of the present embodiment eliminates the default sequential order search section 103 and the default sequential order data creation section 110, and as the data, the logistics operation optimization apparatus 100 of the present embodiment eliminates the default matching table 204 and the default information list table 209.

Now, processing and data flows of the logistics operation optimization apparatus in the embodiment 2 are described with reference to FIG. 15.

Although the processing and the data flows of the logistics operation optimization apparatus in the embodiment 2 are substantially same as those of the logistics operation optimization apparatus in the embodiment 1 depicted in FIG. 12, the default sequential order search section 103 and the default sequential order data creation section 110 are eliminated, and as the data, the default matching table 204 and the default information list table 209 are eliminated.

Now, evaluation of an overall optimum proposal by the overall optimum proposal evaluation section 105 is described.

The overall optimum proposal evaluation section 105 evaluates an overall optimum proposal indicated by the overall optimum proposal list 202 by use of an evaluation index according to the evaluation expression of the expression 4 given below, on the basis of the every-process deviation degree table 203 depicted in FIG. 5, the default matching table 204 depicted in FIG. 7, the estimation operation time table 205 depicted in FIG. 8, and the weight data table 210 depicted FIG. 11. It is evaluated that an overall optimum proposal with regard to which f indicated by the expression 4 has a lower value is a better plan, in other words, that the total operation time becomes shorter. The expression 4 is an evaluation expression that eliminates the term of C from the expression 1 of the embodiment 1.

[Math. 4]

$$f = w_1 A + w_{21} B_1 + w_{22} B_2 + w_{23} B_3 + w_4 D \quad \text{(expression 4)}$$

The definitions of A, $B_i$, D, and $w_i$ are similar to those in the expression 1 of the embodiment 1.

According to the present embodiment, in light of a technical idea basically same as that of the method for optimizing an article sequential order of the logistics operation optimization apparatus of the embodiment 1, a logistics operation optimization apparatus specialized for handling of articles specifically in a production line in a factory can be provided.

Accordingly, according to the present embodiment, it can be expected that the overall line throughput of a production line in a factory is enhanced and, even if business contents in respective processes cannot be linked, it is possible to make an overall optimum plan and reduce the operation time on a production line in a factory according to the overall optimum plan.

While preferred embodiments of the present invention have been described using specific terms, such description is for illustrative purposes only, and it is to be understood that changes and variations may be made without departing from the spirit or scope of the following claims.

What is claimed is:

1. A logistics operation optimization apparatus that performs optimization regarding a sequential order of articles for performing operation in regard to the articles in each operation process to sequentially distribute the articles, the logistics operation optimization apparatus comprising:
    a deviation degree computing section that computes, on a basis of an overall optimum proposal list indicative of overall optimum proposals in which optimum turns of the articles over entire logistics operation are lined up and of an every-process optimum sequential order list in which optimum turns of the articles in each operation process are lined up, for each operation process, a deviation degree between the turns of the articles indicated by the overall optimum proposal list and the turns of the articles in each operation process;
    a default sequential order search section that compares turns of the articles indicated by an overall optimum plan list in the past and turns of the articles indicated by an operation history to search, on a basis of a default information list table in which combinations of turns of the articles, which turns are different at a fixed ratio from each other, are stored, for any combination of turns that are defaulted with respect to the overall optimum plans indicated by the overall optimum search list in the past to obtain a number of combinations of the turns that are defaulted;
    an operation time estimation section that obtains estimation operation time and an error of the estimation operation time from the overall optimum proposal indicated by the overall optimum proposal list;
    an overall optimum proposal evaluation section that obtains an evaluation value of the overall optimum proposal indicated by the overall optimum proposal list according to an evaluation expression that is based on the deviation degree computed by the deviation degree calculation section between the turns of the articles indicated by the overall optimum proposal list and the turns of the articles in each operation process, and the estimation operation time obtained by the operation time estimation section; and
    an overall optimum plan determination section that creates the overall optimum plan list indicative of an overall optimum plan that is determined on a basis of the evaluation value of the overall optimum proposal obtained by the overall optimum proposal evaluation section and in which optimum turns of the articles over the entire logistics operation are lined up, wherein
    the evaluation expression with which the overall optimum plan determination section obtains the evaluation value of the overall optimum proposal is a weighted linear sum of the deviation degree between the turns of the articles in the overall optimum proposal list and the turns of the articles in each operation process, the number of combinations of the turns that are defaulted, and the estimation operation time, and the error of the estimation operation time, and an overall optimum plan execution section that, in response to the determination of the overall optimum plan and creation of the overall optimum plan list, delivers a command of a handled article sequential order to a robot to perform the overall optimum plan indicated by the overall optimum plan list.

2. The logistics operation optimization apparatus according to claim 1,
wherein
the overall optimum proposal evaluation section obtains the evaluation value of the overall optimum proposal according to the evaluation expression based on the number of combinations of the turns, which are default, obtained by the default sequential order search section.

3. The logistics operation optimization apparatus according to claim 1, wherein
the overall optimum proposal evaluation section obtains the evaluation value of the overall optimum proposal according to the evaluation expression that is based on the error of the estimation operation time obtained by the operation time estimation section.

4. The logistics operation optimization apparatus according to claim 1, wherein
the evaluation expression with which the overall optimum proposal evaluation section obtains the evaluation value is a weighted linear sum of the deviation degree between the turns of the articles in the overall optimum proposal list and the turns of the articles in each operation process, and the estimation operation time.

5. The logistics operation optimization apparatus according to claim 2, wherein
the evaluation expression with which the overall optimum proposal evaluation section obtains the evaluation value is a weighted linear sum of the deviation degree between the turns of the articles in the overall optimum proposal list and the turns of the articles in each operation process, the estimation operation time, and the number of combinations of the turns that are defaulted.

6. The logistics operation optimization apparatus according to claim 3, wherein
the evaluation expression with which the overall optimum proposal evaluation section obtains the evaluation value is a weighted linear sum to which terms relating to the deviation degree between the turns of the articles in the overall optimum proposal list and the turns of the articles in each operation process, the estimation operation time, and an error of the estimation operation time are added.

7. The logistics operation optimization apparatus according to claim 2, further comprising:
a default sequential order reference section that creates a default information list table from the overall optimum plan list determined by the overall optimum plan determination section and a site operation history table in which a site operation history is stored.

8. The logistics operation optimization apparatus according to claim 4, further comprising:
an evaluation index weight learning section that learns a weight of a term of the deviation degree according to the overall optimum plan list determined by the overall optimum plan determination section and a site operation history table in which a site operation history is stored.

9. A logistics optimization method by a logistics operation optimization apparatus that perform optimization regarding a sequential order of articles for performing operation in regard to the articles in each operation process to sequentially distribute the articles, the logistics optimization method comprising:

by the logistics operation optimization apparatus, a step of computing, on a basis of an overall optimum proposal list in which optimum turns of the articles over entire logistics operation are lined up and of an every-process optimum sequential order list in which optimum turns of the articles in each operation process are lined up, for each operation process, a deviation degree between the turns of the articles in an overall optimum proposal indicated by the overall optimum proposal list and the turns the articles in each operation process;

by the logistics operation optimization apparatus, a step of comparing turns of the articles of overall optimum plans indicated by an overall optimum plan list in the past and turns of the articles indicated by an operation history with each other to search, on a basis of a default information list table in which combinations of turns of the articles, which turns are different at a fixed ratio from each other, are stored, for any combination of turns that are defaulted with respect to the overall optimum plans indicated by the overall optimum plan list in the past to obtain a number of combinations of the turns that are defaulted;

by the logistics operation optimization apparatus, a step of obtaining estimation operation time and an error of the estimation operation time from the overall optimum proposal indicated by the overall optimum proposal list;

by the logistics operation optimization apparatus, a step of obtaining an evaluation value of the overall optimum proposal according to an evaluation expression, which is based on the deviation degree computed by a deviation degree computing section between the turns of the articles in the overall optimum proposal indicated by the overall optimum proposal list and the turns of the articles in each operation process, the number of combinations of the turns that are defaulted and obtained by a default sequential order search section, and the estimation operation time and the error of the estimation operation obtained by an operation time estimation section;

by the logistics operation optimization apparatus, a step of determining an overall optimum plan on a basis of the evaluation value of the overall optimum proposal obtained by an overall optimum plan determination section, and creating the overall optimum plan list in which optimum turns of the articles over the entire logistics operation are lined up, wherein an evaluation expression with which the overall optimum plan determination section obtains the evaluation value of the overall optimum proposal is a weighted linear sum of the deviation degree between the turns of the articles in the overall optimum proposal list and the turns of the articles in each operation process, the number of combinations of the turns that are defaulted, and the estimation operation time, and the error of the estimation operation time, and by the logistics operation optimization apparatus, in response to the determination of the overall optimum plan and creation of the overall optimum plan list, a step of delivering a command of a handled article sequential order to a robot to perform the overall optimum plan indicated by the overall optimum plan list.

\* \* \* \* \*